United States Patent [19]

Yamada et al.

[11] Patent Number: 4,623,233
[45] Date of Patent: Nov. 18, 1986

[54] ELECTROMAGNETICALLY DRIVEN SHUTTER DEVICE

[75] Inventors: Minoru Yamada; Eiji Ito; Masaru Nagai, all of Hachioji, Japan

[73] Assignee: Konishiroku Photo Industry Co., Ltd., Tokyo, Japan

[21] Appl. No.: 841,016

[22] Filed: Mar. 17, 1986

Related U.S. Application Data

[63] Continuation of Ser. No. 564,007, Dec. 21, 1983.

[30] Foreign Application Priority Data

Dec. 23, 1982 [JP] Japan ................. 57-225051
Dec. 23, 1982 [JP] Japan ................. 57-225052
Dec. 23, 1982 [JP] Japan ................. 57-225053
Dec. 23, 1982 [JP] Japan ................. 57-225054
Dec. 23, 1982 [JP] Japan ................. 57-225055
Dec. 23, 1982 [JP] Japan ................. 57-225059
Dec. 23, 1982 [JP] Japan ................. 57-225060

[51] Int. Cl.⁴ ............................................. G03B 9/08
[52] U.S. Cl. ................................... 354/229; 354/230; 354/234.1; 354/250; 354/271.1
[58] Field of Search ............... 354/226, 227, 228, 229, 354/230, 233, 234.1, 258.1, 435, 440, 231, 271.1, 250

[56] References Cited

U.S. PATENT DOCUMENTS 4,322,145  3/1982  Yamada et al. ............. 354/435
4,415,251 11/1983  Petersen ..................... 354/230
4,470,687  9/1984  Saito et al. ................. 354/435

Primary Examiner—L. T. Hix
Assistant Examiner—David M. Gray
Attorney, Agent, or Firm—Jordan B. Bierman

[57] ABSTRACT

An electromagnetically driven shutter device in which a first coil drives shutter blades to control an aperture and shutter time. A second coil controls the moving distance, that is maximum aperture, of the first coil by being located at a plurality of positions including its initial position.

21 Claims, 13 Drawing Figures

ELECTROMAGNETICALLY DRIVEN SHUTTER DEVICE

This application is a continuation of application Ser. No. 564,007, filed 12/21/83.

BACKGROUND OF THE INVENTION

1. Field of the Invention

The present invention relates to improvements in the stop-and-shutter device of a camera and, more particularly, to an electromagnetically driven shutter device which is powered by an electromagnetic force obtained by fixed permanent magnets and moving coil members to move one or more shutter blades for opening or closing the stop.

2. Description ot the Prior Art

Generally, electromagnetically driven shutter devices can fully control the velocity, direction, and so on of driven shutter blades by the direction and amount of the electric current fed to a moving coil member. Therefore, they do not require a complicated mechanism, such as a mechanical shutter driven by a spring force, and dispense with a delay governor mechanism consisting of a combination of gears and a sector wheel. Further, they are thin and compact.

In known electromagnetically driven shutter devices, however, shutter blades are driven only one moving coil member interposed between permanent magnets and a yoke to make the gap between the magnets and the yoke as narrow as possible for reducing the loss in the magnetic circuit. Accordingly, it is possible for a program shutter having stop-and- shutter blades serving as a stop , or a diaphragm, and also as the tripping means of the shutter to move from the closed side to the open side and the vice versa in a reciprocating manner. However, it is impossible for such a shutter to move the blades for opening or closing the shutter while keeping the diameter ot the aperture of the stop at a specific value, unless a separate and complicated delay governor mechanism is provided. Thus, conventional electromagnetically driven shutter devices cannot help but adopt programs in which the diameter of the aperture ot the stop and the time required for the shutter to complete its motion are related to each other such that they draw triangles when the diameter is taken on the ordinate and the time is taken on the abscissa of a graph. For this reason, it has been heretofore difficult to take a photograph taking into account the effect of a stop such as encountered when the focal depth is optimized, unless the diameter happens to coincide with the value set by a uniquely determined program. In this way, the conditions under which photographs can be taken are quite limited.

Also in the conventional, electromagnetically driven shutter devices having the fixed permanent magnets, the yoke disposed opposite to the magnets, and the movable coil member interposed between these components, the movable coil member is driven by the electromagnetic force which is produced by energizing it. When the coil member is not energized, i.e., when no electromagnetic force is produced, it is free to move. Hence, it is customary to use a spring to accurately hold the coil member in its initial position. It is therefore required that the coil member be driven against the spring force.

Unfortunately, as the coil member is moved a greater distance, a greater force must be exerted by the spring. This requires that a correspondingly larger electric current be supplied to the coil member, thereby rendering the associated control circuit more complicated. This problem may be solved by feeding a large current from the first, but it is not preferable to use such a large current, because this greately shortens the life of a small battery generally used in a camera.

OBJECTS AND SUMMARY OF THE INVENTION

It is an object of the present invention to provide an electromagnetically driven shutter device which is free of the foregoing problems with the prior art device and which has a plurality of moving coil members placed one on top of the other between fixed permanent magnets and a yoke, the coil members acting to controllably drive a shutter blade and being operated one after another, so that the device can permit any desired exposure control.

It is another object of the invention to provide an electromagnetically driven shutter device which has a plurality of moving coil members disposed between fixed permanent magnets and a yoke to drive a stop-and-shutter blade and to control the diameter of the aperture of the stop independently of the drive operation of the blade, and which permits one to select a desired exposure control mode from manual exposure control mode, stop priority automatic exposure control mode, automatic exposure control mode utilizing a combination of stop and time, etc.

It is a further object of the invention to provide an electromagnetically driven shutter device which has two moving coil members between fixed permanent magnets and a yoke, one of the coil members acting to drive a stop-and-shutter blade, the other acting to set the aperture of a stop, these members being operated one after another such that one of them is started after or during the operation of the other, whereby permitting one to select a desired exposure control mode.

It is a still further object of the the invention to provide an electromagnetically driven shutter device which has two moving coil members between fixed permanent magnets and a yoke, one of the members acting to drive a stop-and-shutter blade, the other acting to control the distance that said driving coil member moves by being located at a plurality of points including its initial point and points angularly displaced clockwise and counterclockwise from the initial point, whereby permitting one to select a desired exposure control mode. Should the coil members be not energized, the shutter device still permits taking of a photograph while hardly affected thereby by establishing a correspondence between the normal value of the aperture of the stop and the initial position of the control coil member. Also, the shutter device permits taking of a photograph without the need to energize the control coil member when the normal value of the aperture of the stop is used.

It is a yet further object of the invention to provide a simple electromagnetic shutter device comprising fixed permanent magnets, a yoke disposed opposite to the magnets, moving coil members disposed between these components, a plurality of ferromagnetic members firmly fixed on the same circumference as the coil members, and a fixed electromagnet opposite to one of the ferromagnetic members, whereby maintaining the diameter of the aperture of the stop.

It is an additional object of the invention to provide a moving coil member having ferromagnetic members

DETAILED DESCRIPTION OF THE INVENTION

Figure 1:
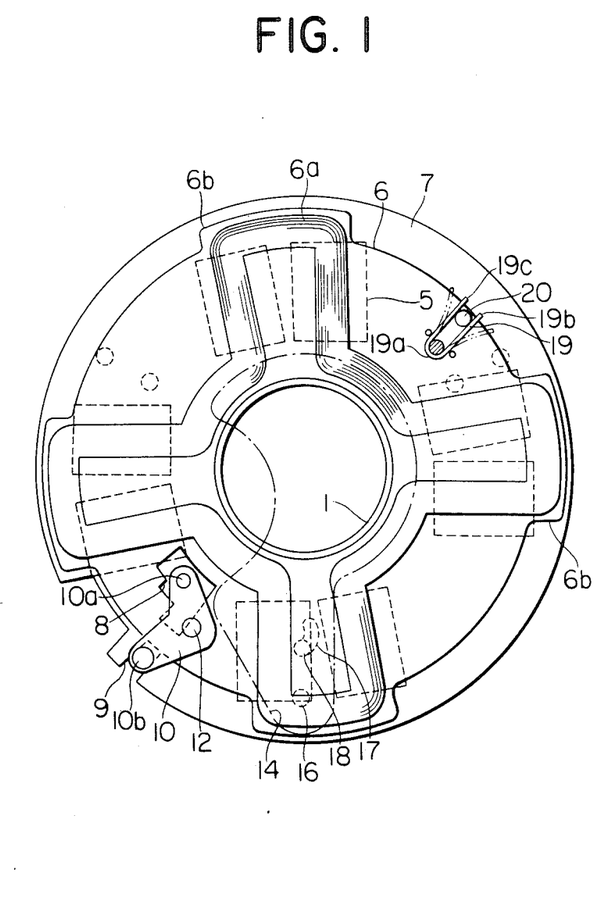
FIG. 1 is a front elevation of the moving coil members of a shutter device according to the present invention.
Figure 2:
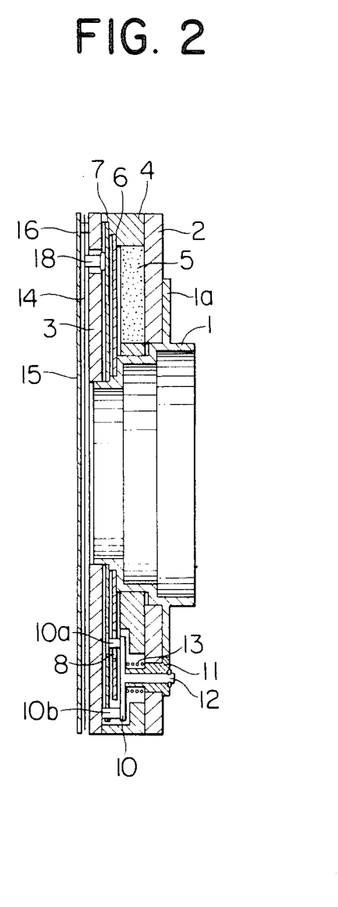
FIG. 2 is a side elevation in section of the coil members shown in FIG. 1.
Figure 3:
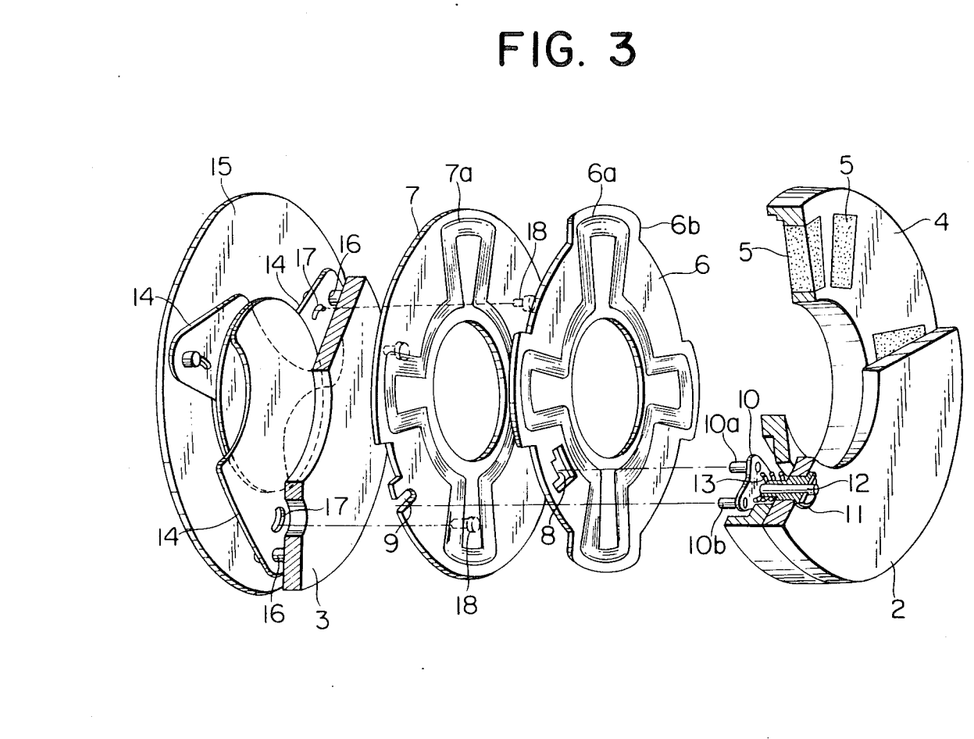
FIG. 3 is an exploded perspective view of the coil members shown in FIg. 1.

Referring first to FIGS. 1-3, there is shown a typical example of shutter device according to the present invention. The device has one or more lenses (not shown) for taking photographs, and a lens frame 1 surrounding the lenses. Mounted above the outer periphery of the frame 1 are a first yoke 2 and a second yoke 3. These yokes are disposed opposite to each other such that a support frame 4 is sandwiched between them. A plurality of permanent magnets 5 are imbedded in the frame 4 in such a way that they are equally spaced circumferentially. In the gap between the yoke 3 and the magnets 5, a first moving coil member 6 and a second moving coil member 7 are mounted one on top of the other, leaving a slight space therebetween. The coil members 6 and 7 have coil patterns 6a and 7a formed thereon, respectively. The lens frame 1 has a flange 1a to which the first yoke 2 is securely fixed with screws (not shown), or similar means. The frame 4 is attached to the yoke 2 by means of the attracting force of the magnets 5, at which time the position of the frame 4 is limited. Also, the second yoke 3 is attached to the frame 4 by means of the attracting force of the magnets 5 while its position is limited. Therefore, the space which is formed in the magnetic circuit comprising the magnets 5 and the second yoke 3 and in which the coil members 6, 7 are disposed is kept constant at all times.

The first moving coil member 6 is provided with a cam groove 8 which is formed by blanking so as to have steps. Although the groove 8 has three steps in the figures, the number of the steps formed in the groove is not limited to three. The second coil member 7 has an outer fringe provided with a recess 9. A stop control lever 10 has pins 10a and 10b which engage with the groove 8 and the recess 9, respectively. The lever 10 is mounted on a shaft 12 and is biased in a clockwise direction by the action of a spring 13. The shaft 12 is rotatably held to a bearing member 11 which has a base fixedly secured to the first yoke 2.

Normally, the first coil member 6 is held in the condition that the pin 10a of the lever 10 lies at the intermediate point of the cam groove 8 by a resilient member 19, which is comprised of a U-shaped portion 19a (see FIG. 1) of a spring member and both end portions 19b and 19c. The U-shaped portion 19a is fixedly secured to the frame 4. A pin 20 fixed upright to the first coil member 6 is held between the end portions 19b and 19c. Thus, when the first coil member 6 is not excited, it is held in its initial position by the resilience of the resilient member 19. On the other hand, when the member 6 is excited, it is supplied with a signal from a diaphragm control circuit (not shown), so that it is rotated clockwise or counterclockwise from its initial position as indicated by the phantom lines in FIG. 1 against the action of the end portion 19b or 19c of the resilient member 19. When the supply of the signal is cut off, the resilience of the end portion restores the member 6 to its initial position. The member 6 can be moved until both end fringes of a protrusion 6b formed on the outer periphery of the member 6 abut on the anchoring portions (not shown) of the support frame 4.

The second moving coil member 7 is excited and turned in a counterclockwise direction after the first coil member 6 is retained in either its initial position or a position angularly displaced clockwise or counterclockwise from it. This causes the lever 10 engaging with the recess 9 via the pin 10b to rotate in a counterclockwise direction in opposition to the action of the spring 13 fitted over the bearing member 11. When the second coil member 7 is deenergized, the resilience of the spring 13 rotates the lever 10 in a clockwise direction, which returns the member 7 to its original position.

Stop shutter blades 14 are installed between the second yoke 3 and a pressure plate 15 disposed at the back of the yoke 3. The base portion of each blade 14 is provided with a hole in which corresponding one of shafts 16 protruding from the second yoke 3 is fitted. Near the base portion, each blade 14 is further formed with an arc-shaped groove 17 with which corresponding one of pins 18 fixed upright to the second coil member 7 engages. Thus, when the second member 7 is rotated counterclockwise as described above, the blades 14 are moved toward the direction to open the aperture of the stop. At the same time, the control lever 10 is turned in a counterclockwise direction. Then, the pin 10a of the lever 10 abuts on one of the steps of the groove 8, depending on the position to which the first coil member 6 has been already rotated. This halt of the pin 10a also stops the second coil member 7, thus setting the diameter of the aperture of the stop at that position. In this way, the distance that the shutter blades 14 move depends on the distance that the second coil member 7 moves. The latter distance of the member 7 is, in turn, limited by the distance that the lever 10 engaging with the groove 8 in the first coil member 6 moves. Hence, by establishing a correspondence between the step of the groove 8 and the diameter of the aperture of the stop set by the blades 14, the diameter of the aperture is automatically limited.

Now let us assume that the groove 8 in the first coil member 6 has three steps as shown and that the intermediate step, the deeper step, and the shallower step of the groove 8 as viewed clockwise correspond to F 5.6, F 2.8, and F 11, respectively, to perform exposure controls as described below.

Figure 4:
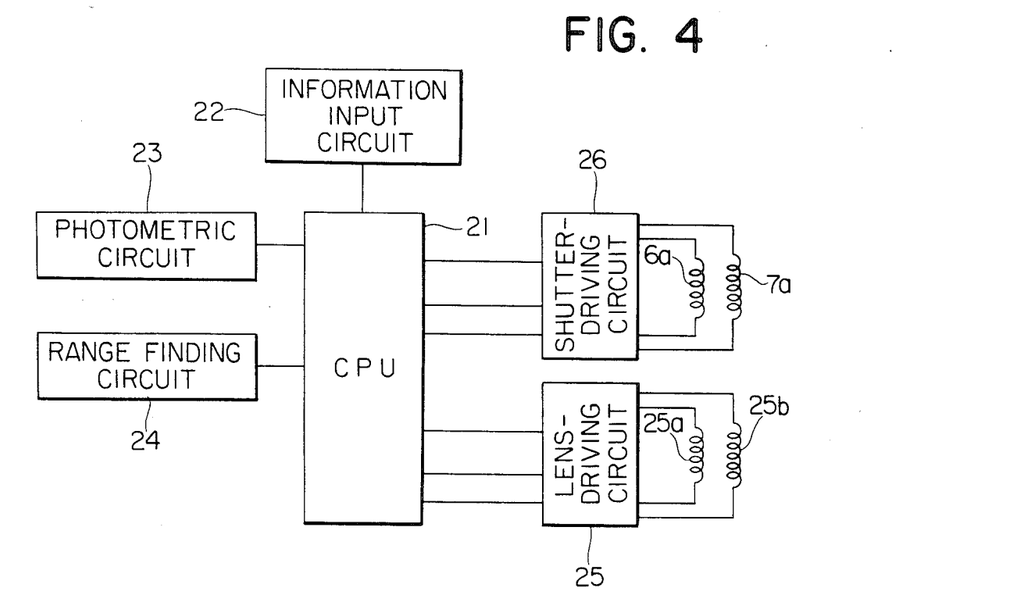
FIG. 4 is a block diagram of the electric circuit of the shutter device.
Figure 5:
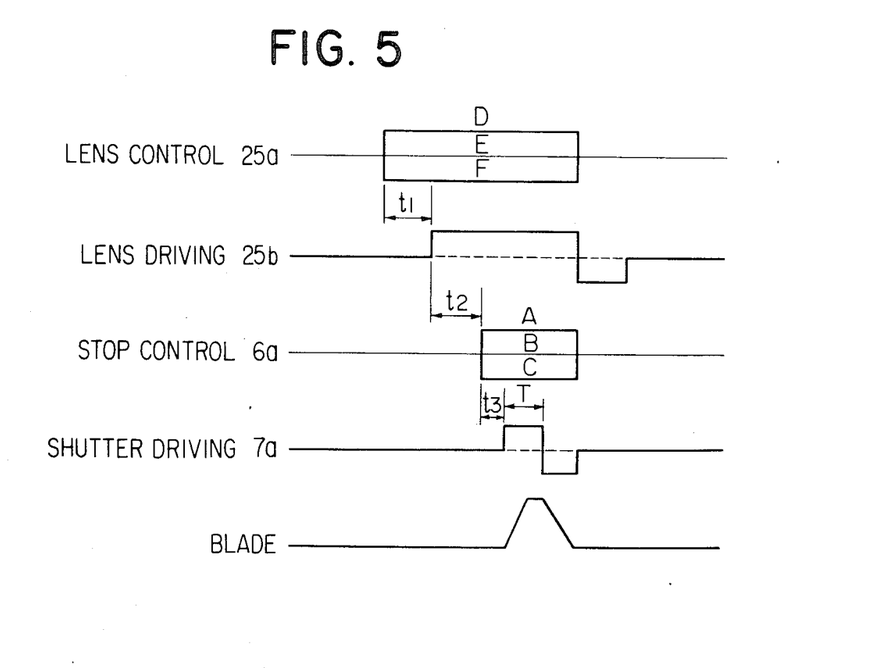
FIG. 5 is a time chart showing the various time relationships of waveforms appearing in the circuit shown in FIG. 4.

Referring next to FIG. 4, the aformentioned moving coil members 6 and 7 are driven by a circuit 26 which is connected to a control apparatus 21 incorporating one or more exposure control programs that permit manual exposure control mode, stop priority automatic exposure control mode, exposure control mode automatically determining the time that the stop is open, and automatic exposure control mode utilizing a combination of stop and time. Also connected to this control apparatus 21 are an information input circuit 22 for supplying information concerning film sensitivity, photograph-taking modes, etc. to the apparatus, a photometric circuit 23 for supplying information about exposure values to it, an odometrical circuit 24 for supplying information regarding distance to it, and a lens-driving circuit 25. When a release button (not shown) is depressed, the information input circuit 22 furnishes information concerning film sensitivity, photograph-taking modes, etc. to the control apparatus 21. Then, the apparatus 21 receives information about exposure values from the photometric circuit 23 and information about distance from the odometric circuit 24, and it arithmetically processes the information concerning the exposure values and the distance, utilizing the information including the photograph-taking mode from the information input circuit 22 to produce a diaphragm control signal, driving signals, a signal indicating the direction of flow of electric current to the circuit 26 that drives the moving coil members 6 and 7. The coil patterns 6a and 7a of the coil members 6 and 7, respectively, are excited one after another. Similarly, a lens control signal, a lens driving signal, and a signal indicating the direction of flow of electric current are applied to the lens-driving circuit 25, and moving coils 25a and 25b are excited. In this fashion, the shutter blades and the lenses are driven in a sequence as shown in the time chart of FIG. 5, in which $t_1$, $t_2$, and $t_3$ indicate time lags. Indicated by T is a time period during which the shutter blades are tripped. Reference characters A through F indicate the positive or negative polarity, or ceasing of electric current.

Now suppose that the cam groove 8 in the first coil member 6 has three steps as shown and that the intermediate step, the deeper step, and the shallower step as viewed clockwise correspond to F 5.6, F 2.8, and F 11, respectively. Then, it is possible to perform the following exposure controls.

<1> Stop Priority Automatic Exposure Control Mode.

When the release button (not shown) is depressed, a stop value is derived from the stored values by the instructions of the control apparatus 21, according to the conditions including the luminance of the object to be photographed, and the distance to the object. If the derived stop value is F 11, for example, then the direction of flow of electric current to be supplied to the coil 6a of the first coil member 6 is determined. Then, a signal indicating this direction is applied to the driving circuit 26. Subsequently, a stop control signal is produced to excite the coil 6a. This rotates the first coil member 6 in a counterclockwise direction against the resilience of the resilient member 19, and then the member 6 stops. After completing the energization of the coil pattern 6a of the first coil member 6, the driving circuit 26 excites the coil pattern 7a of the second coil member 7. Then, a suitable period during which the shutter blades are tripped is calculated using the stop value derived as described previously. The second coil member 7 then begins to rotate in a counterclockwise direction in a velocity matched to the calculated period. This rotation of the member 7 turns the control lever 10, which engages with the recess 9 via the pin 10b, also in a counterclockwise direction and urges the shutter blades 14 to open the aperture.

When the pin 10a of the lever 10 engages with the step of the groove 8 in the coil member 6 set for F 11, the second coil member 7 is also halted. At the same time, the blades 14 which continued to move are held in that position. In this case, if the suitable period during which the shutter blades are tripped is long, the coil members 6 and 7 are also maintained in those conditions.

The supply of current to the coil members 6 and 7 is cut off immediately before the suitable period elapses. This causes a resilient member (not shown) to restore the first coil member 6 to its initial position, i.e., the intermediate step of the groove 8 with which the pin 10a of the lever 10 engages. Then, the resilience of the spring 13 of the lever 10 rotates the second coil member 7 in a clockwise direction up to its initial position, thus completing the exposure control operation.

<2> Automatic Exposure Control Mode Utilizing a Combination of Stop and Time The first coil member 6 is displaced such that the pin 10a of the diaphragm control lever 10 is located on the open side of the groove 8 corresponding to F 2.8. The distance that the second coil member 7 moves can be controlled by changing its velocity. This can be achieved by varying either the period during which the member 7 is energized or the magnitude of the electric current. If the value of the stop obtained by the arithmetic operations is F 16, for example, the first coil member 6 is rotated in a counterclockwise direction so that the pin 10a of the lever 10 may be placed in the position in the groove 8 corresponding to F 11. If the value is F 8, then the pin 10a may be brought into the position in the groove 8 corresponding to F 5.6. Other various control operations may be adopted at will.

<3> Manual Control Mode

This control mode can be effected as long as combinations ot the aforementioned stop priority automatic exposure control mode and automatic exposure control mode utilizing a combination of stop and time permit.

As hereinbefore described, in the novel device, the two moving coil members are disposed between the fixed permanent magnets and the yoke opposite to the magnets, one of the coil members acting to drive the stop shutter blades, the other acting to determine the diameter of the aperture of the stop. These coil members are driven one after another. Hence, the small-sized and lightweight device can permit stop priority automatic exposure control mode and manual exposure control mode which have been impossible for the prior art electromatically driven shutter device, as well as automatic exposure control mode utilizing a combination of stop and time.

Figure 6:
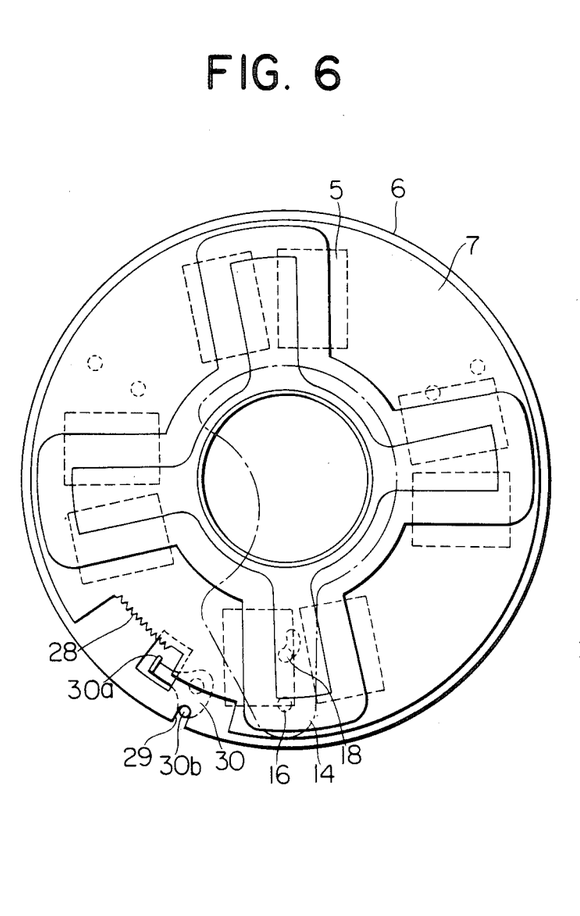
FIG. 6 is a front elevation of another shutter device according to the invention.
Figure 7:
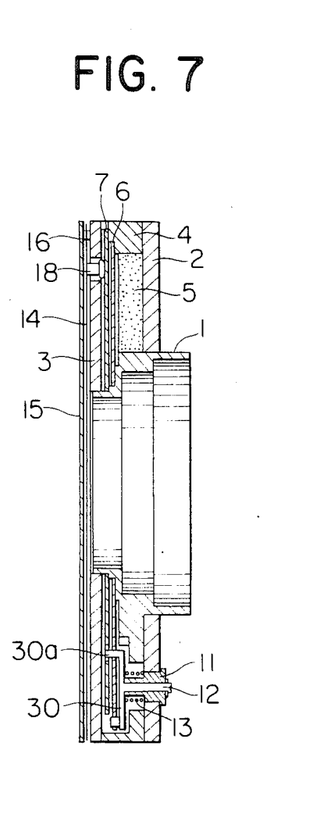
FIG. 7 is a side elevation in section of the shutter device shown in FIG. 6.

Referring next to FIGS. 6 and 7, there is shown another shutter device according to the invention. Note that the same components of this device as those shown in FIGS. 1–3 are indicated by the same reference numerals as in the previous figures. The second moving coil member 7 of this device is provided with a jagged tooth 28 for controlling the diameter of the aperature of the stop. The device includes a diaphragm control lever 30 having a claw 30a at its tip, and is so constructed that the first moving coil member 6 causes the claw 30a to enter the tooth 28 with a snap. In particular, the lever 30 has a pin 30b which engages with a groove 29 formed in the first coil member 6. When the member 6 rotates in a clockwise direction, the claw 30a at the tip of the lever 30 enters the tooth 28 with a snap, thereby stopping the second coil member 7 which were driving the stop shutter blade 14 at that position. As a result, the diameter of the aperture formed by the blade 14 is limited.

In this embodiment, when the release button (not shown) is depressed, an exposure control circuit (not shown) is operated according to the luminosity of the object to be photographed. The control circuit then calculates the value of the stop and the period during which the blade is tripped. Thereafter, the second coil member 7 is caused to turn in a counterclockwise direction in accordance with a predetermined program. Thus, the blade 14 begin to open the aperture, and just when an appropriate diameter of the aperture is attained, the first coil member 6 moves in a clockwise direction. This rotates the lever 30 so that the claw 30a may engage with the jagged tooth 28, whereby providing an appropriate exposure. Thereafter, the first coil member 6 is de-energized, so that it returns to its initial position. This disengages the claw 30a at the tip of the lever 30 from the tooth. At the same time, the second coil member 7 is also de-energized, thus completing the exposure operation.

Figure 8:
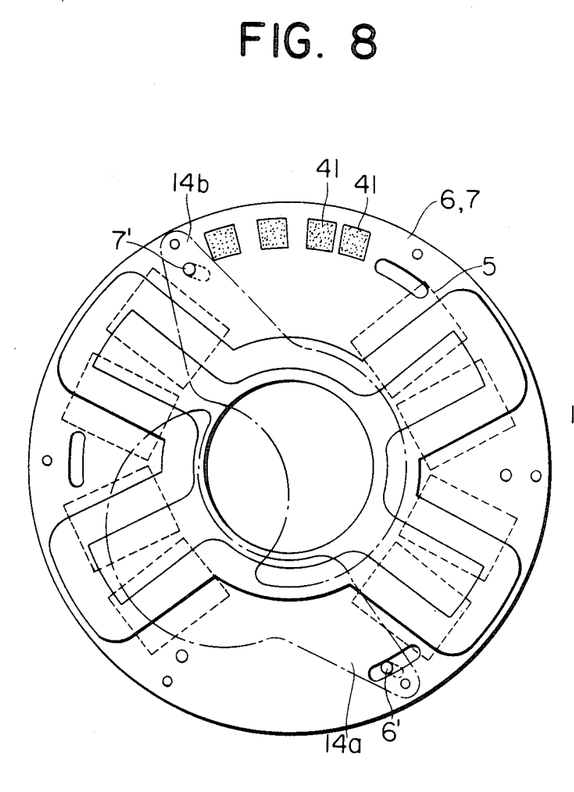
FIG. 8 is a front elevation of still another shutter device according to the invention.
Figure 9:
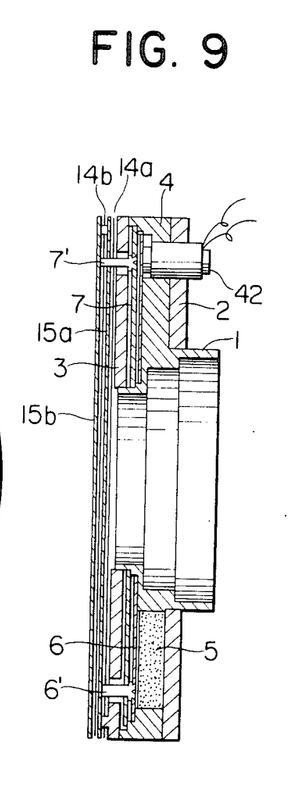
FIG. 9 is a side elevation in section of the shutter device shown in FIG. 8.

Referring next to FIGS. 8 and 9, there is shown a further shutter device according to the invention. This device includes a stop blade 14a and a shutter blade 14b which is formed independently of the blade 14a. The stop blade 14a is anchored to a pin 6' formed on the first coil member 6 and is moved by the member 6 to open or close the aperture of the stop. The snutter blade 14b is anchored to a pin 7' formed on the second coil member 7 and is moved by the member 7 to open and close the aperture ot the stop.

Ferromagnetic members 41 whose number corresponds to the number of diaphragm control stages are fixed to the first coil member 6. The distance that the coil member 6 moves is limited by the attractive force of an electromagnet 42 firmly secured to the support frame 4 to determine the diameter of the aperture of the stop blade 14a. The stop blade 14a is disposed between the second yoke 3 and the first pressure plate 15a, while the shutter blade 14b is disposed between the first pressure plate 15a and a second pressure plate 15b. A fixed electromagnet 42 is disposed opposite to one of the ferromagnetic members 41 fixed to the coil member 6 and is mounted to the frame 4 holding the permanent magnets 5. The electromagnet 42 incorporates a permanent magnet and is a so-called ON type magnet. In particular, when the electromagnet 42 is not energized, the the permanent magnet acts to attract one of the ferromagnetic members 41 to it. When it is energized, the electromagnet serves to cancel out the attracting force of the permanent magnet.

In this embodiment, when the release button (not shown) is depressed, the exposure control circuit (not shown) calculates the stop value and the period during which the blades are tripped, based on the luminosity of the object to be photographed, and other factors. According to this result, the electromagnet 42 is energized, causing the first coil member 6 to release the ferromagnetic member 41. Simultaneously, the coil is excited and member 6 commences rotating in a counterclockwise direction. This causes the stop blade 14a to start exposing the stop while it is anchored to the pin 6' of the coil member 6. Just when a predetermined diameter of aperture is attained by the blade 14a, the first coil member 6 and the electromagnet 42 are de-energized, so that one of the ferromagnetic memhers 41 attached to the coil member 6 is attracted and fastened to the electromagnet 42, maintaining the aperture of the stop at the predetermined value. Subsequently, supply ot electric current to the second coil member 7 is initiated to rotate it in a clockwise direction. Thus, the shutter blade 14b begins to move and exposes the stop while it is anchored to the pin 7'. Just when the shutter blade 14b forms a larger aperture than the stop blade 14a and an appropriate exposure is attained, the supply of current to the second coil member 7 is cut off. Then, a spring (not shown) returns the coil member 7 to its original position, moving the shutter blade 14b so as to close the aperture of the stop. If the velocity or the blade 14b determined solely by the spring force is not satisfactorily high, a reverse current may be applied to the coil member 7 when the blade 14b closes the aperture. After the aperture is closed by the blade 14b in this way, a reverse current is fed to the first coil member 6 and the magnet 42, rotating the coil member 6 in a clockwise direction. This moves the stop blade 14a so as to close the aperture of the stop. Just when it is closed, the first coil member 6 and the electromagnet are de-energized, thus completing the exposure operation.

Figure 10:
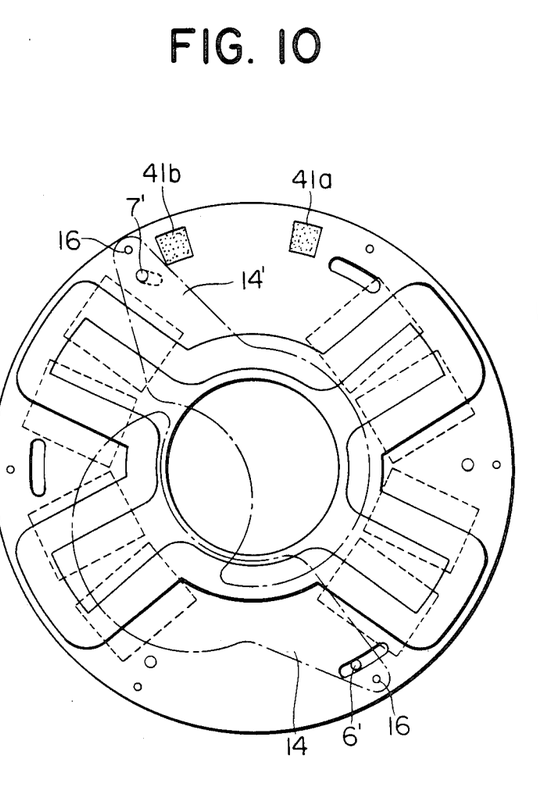
FIG. 10 is a front elevation of yet another shutter device according to the invention.
Figure 11:
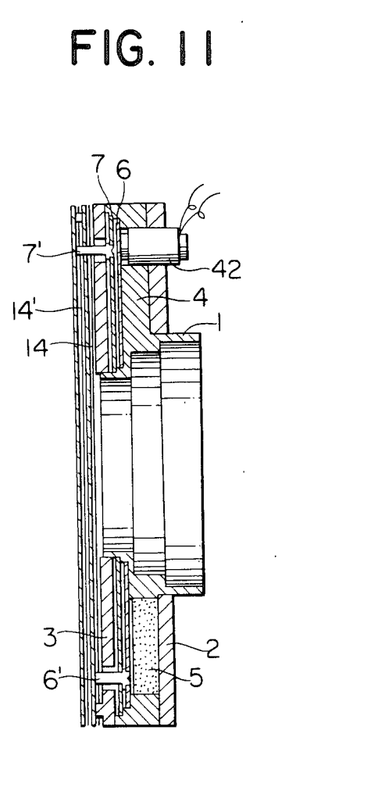
FIG. 11 is a cross-sectional view of the shutter device shown in FIG. 10.

Referring next to FIGS. 10 and 11, there is shown a still further shutter device accorcing to the invention. In this embodiment, the first moving coil member 6 and the second moving coil member 7 cooperate to move shutter blades 14 and 14' which are anchored to pins 6' and 7' of the coil members 6 and 7, respectively. These coil members 6 and 7 are constructed so that they are moved in different directions from each other each time an exposure operation is completed. Accordingly, the blades 14 and 14' anchored to the coil members are also moved in different directions from each other. For example, when the first coil member 6 moves the blade 14 to open the aperture, the second coil member 7 moves the blade 14' to close the aperture. The range in which the coil members 6 and 7 can move is controlled by two ferromagnetic members 41a and 41b and two corresponding electromagnets 42 mounted in the support frame 4. The ferromagnetic members 41a and 41b are spaced a certain distance and are attached to the coil members 6 and 7.

In this embodiment, it is possible to perform an exposure control in which the diameter of the aperture of the stop and the period during which either blade is tripped have a relation drawing a triangle as described above, by starting the coil members 6 and 7 one after another. These coil members are moved only once and so reciprocation is not required for them. Consequently, these coil members can obtain a stable velocity during operation.

As hereinbefore described, in the novel shutter device, the plurality of moving coil members are disposed one on top of the other in the magnetic circuit which is formed between the fixed permanent magnets and the yoke opposite to the magnets. Hence, the control function of the stop shutter blade is made independent of the driving function. Therefore, it is possible to perform stop priority automatic exposure control mode and manual exposure control mode which have been heretofore unfeasible, by the use of the small-sized and lightweight electromagnetic driving device.

Another advantage is that the diameter of the aperture of the stop can be controlled readily and stably by using a combination of the cam groove and the stop control lever, a combination of the jagged tooth and the stop control lever, or a combination of ferromagnetic members and the electromagnet.

Additionally, according to the invention, the distance that the moving coil member driving the stop shutter blade moves is controlled depending on whether the controlling coil member is in its initial position or a position displaced angularly clockwise or counterclockwise. Accordingly, by establishing a correspondence between the normally used value such as F 5.6 and the initial position of the controlling moving coil member, even if the first coil member should not be energized, the value is maintained at F 5.6 at all times, thus hardly affecting taking of a photograph. Further, by preventing the first coil member from getting energized at the normal value or the stop under control of a central processing unit (CPU), the consumption of electric power can be reduced greately, thereby lengthening the life of a battery used to a great extent.

In the above embodiments, the frame holding the permanent magnets is formed independently of the frame of the photograph-taking lenses. It is also possible, however, that both components can be integrally formed from resin.

Furthermore, according to the invention, the two moving coil members are disposed one on top of rhe other between the fixed permanent magnets and the yoke opposite to the magnets, one or the coil members acting to control the diameter of the aperture of the stop, the other acting to control the period during which one or more blades are tripped. Botn of these functions are served independently. In another feature, the circuit driving the moving coil members is connected to the control apparatus wnich incorporates one or more programs controlling manual exposure, stop priority automatic exposure, automatic exposure control automatically setting the period during which the blade is tripped, and automatic exposure control utilizing a combination of stop and time. Consequently, the small-sized and ligntweignt device permits stop priority automatic exposure control mode which has been heretofore unfeasible with the conventional electromagnetically driven shutter device, as well as automatic exposure control mode utilizing a combination of stop and time.

In addition, according to the above embodiment, control over the diameter of the aperture of the stop limits the distance that the second coil member moves by the use of of both the cam groove formed in the first coil member and the diaphragm control lever engaging the groove via the pin. Since the plurality of moving coil members are used, various methods can be adopted to control the distance that the second coil member moves by the operation of the first coil member. Any one of those methods allows one to obtain a diameter of the aperture of the stop stably.

Further, since the initial position is always maintained by the resilient member, by establishing a correspondence between the normally used stop value, i.e., most frequently employed value, such as F 5.6 and the initial position of the first coil member, even if the first coil member should not be energized, taking of a photograph is hardly affected thereby. Also, by employing a central processing unit (CPU) which does not permit the first coil member to be excited at the normally used value, the electric power consumed is reduced greatly, tnus lengthening the life of the battery used greatly.

In still another feature of the invention, the two moving coil members are disposed between the fixed permanent magnets and the yoke opposite to the magnets, one of the coil members serving to drive the shutter blade, the other serving to control the distance that the driving coil member moves by being located at a plurality of points including its initial position and positions displaced angularly clockwise and counterclockwise. Hence, the small-sized and lightweight device permits stop priority automatic exposure control mode and manual exposure control mode which have been heretofore unfeasible with the prior art electromagnetically driven shutter device, as well as automatic exposure control mode utilizing a combination of stop and time.

In a yet further feature of the invention, the device comprises the fixed permanent magnets disposed around one or more lenses, the yoke disposed opposite to the magnets, the moving coil members disposed in the gap between the magnets and the yoke, and the stop blade driven by the moving coil member. Therefore, the small-sized and light-weight device permits stop priority automatic exposure control mode and manual exposure control mode as well as automatic exposure control mode utilizing a combination of stop and time without the need to provide a stop blade driving system and a stop diameter setting mechanism separately like conventional stop devices. That is, although it is quite simple in structure, it is capable of defining a desired aperture accurately. Particularly, when it is applied to a camera having an electric control means to determine the diameter of the aperture of the stop in automatic exposure control mode, the driving and control mechanisms can be made quite simple.

Figures 12, 13:
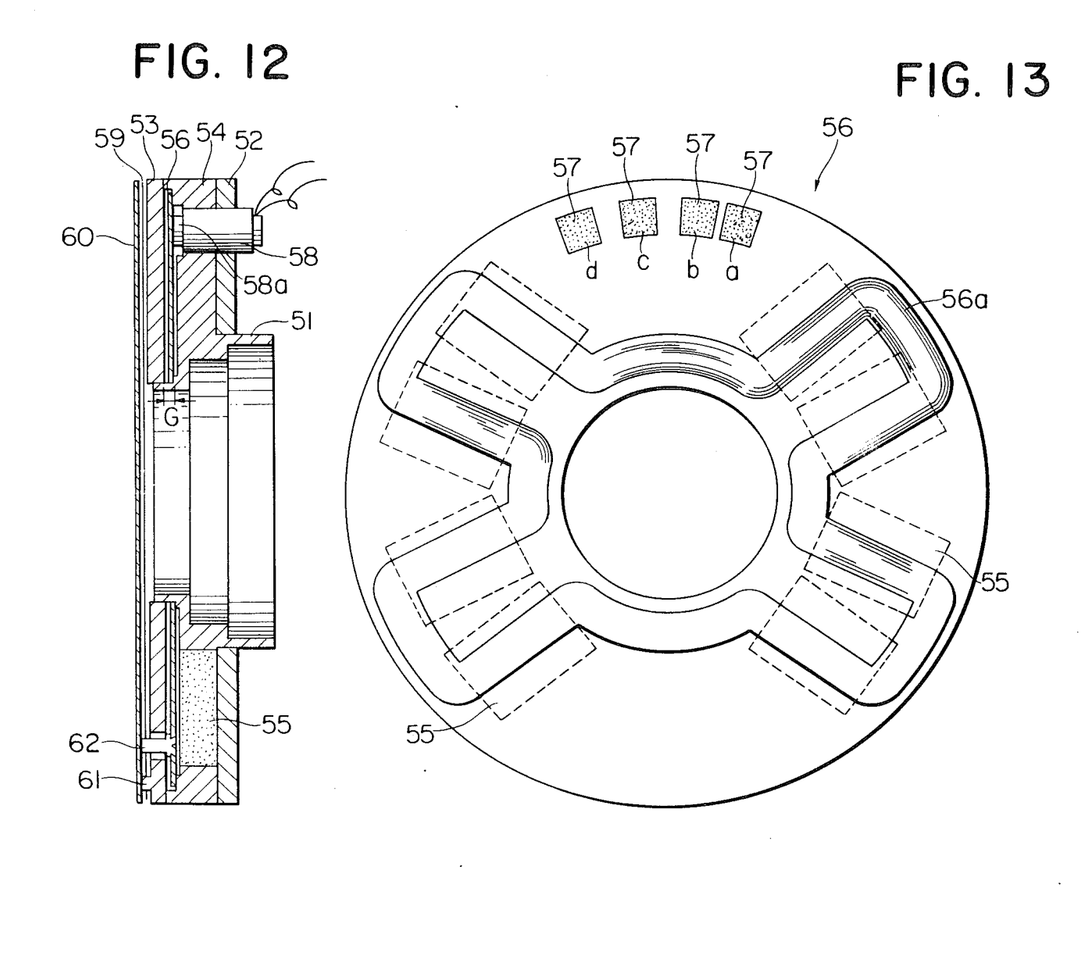
FIG. 12 is a front elevation in section of a further shutter device according to the invention.
FIG. 13 is a front elevation of the moving coil member of the shutter device shown in FIG. 12.

Referring next to FIGS. 12 and 13, there is shown a still further shutter device according to the invention. This device includes one or more lenses (not snown) for photographing objects, a lens frame 51 surrounding the lenses, a support frame 54 formed integrally with the lense frame 51 by molding, and fixed permanent magnets 55 equally spaced and mounted in the frame 51. A first yoke 52 is fixed to the front surfaces of the magnets 55 by attractive force. A second yoke 53 is fixed on each rear side of the magnets 55 by the attractive force, leaving a certain gap G therebetween. A moving coil member 56 is disposed in the gap G between the yoke 53 and the magnets 55 and is rotatable about the frame 51. A driving coil pattern 56a is provided in the coil member 56. A plurality of ferromagnetic members 57 whose number (four in the figure) corresponds to the number of diaphragm control stages are securely fixed on the same circumference as the coil 56a but in such a position that they do not interfere with the coil pattern 56a. A thin plate of soft iron or high silicon iron is preferably used for the ferromagnetic members 57, which can fixed by lamination but any other means may be used instead. A fixed electromagnet 58 is disposed opposite to one of the ferromagnetic members 57 fixed to the coil member 58 and is mounted to the frame 54 holding the permanent magnets 55. The electromagnet 58 incorporates a permanent magnet 58a and is a so-called ON type magnet. In particular, when the electromagnet 58 is not energized, the permanent magnet 58a acts to attract one of the ferromagnetic members 57 to it. Wnen it is energized, the electromagnet serves to cancel out the attracting force of the permanent magnet 58a. A stop shutter blade 59 is pivoted to a shaft 61 between a second yoke 53 and a pressure plate 60, which is at a certain distance from the yoke 53 and is fixed with screws (not shown). The blade 59 engages with a pin 62 installed upright to the coil member 56 and acts to open and close the aperture of the stop in an interlocking relation with rotation of the coil member 56.

In the operation of the moving coil member described above, when the release button (not shown) is depressed while the camera is directed to an object to be photographed, the exposure control circuit (not shown) calculates the stop value and the period during which the shutter blade is tripped, corresponding to the luminosity of the object. Then, the fixed electromagnet 58 is energized immediately before the coil pattern 56a of the moving coil member 56 is energized in accordance with a predetermined program. As already described, the electromagnet 58 attracts one of the ferromagnetic members 57 by the action of the permanent magnet 58a during deenergization of the electromagnet 58, but this energization cancels out the attracting force of the magnet 58a, allowing the coil member 56 to turn. Immediately thereafter, the coil pattern 56a of the coil member 56 is energized and so the coil member 56 is rotated. At the same time, the blade 59 interlocks with the rotation and begins to open the aperture of the stop. Just when an appropriate exposure is obtained by the aperture formed by the blade 59, the supply of electric power to the coil member 56 and to the fixed electromagnet 58 is cut off, so that the permanent magnet 58a in the electromagnet 58 functions to attract one of the ferromagnetic member 57. At this time, the diameter of the aperture of the stop is maintained. Thereafter, when the electromagnet 58 is energized again and the coil member 56 is rendered rotatable, a reverse current is applied to the coil pattern 56a of the coil member 56. The result is that the blade 59 closes the aperture of the stop.

As thus far described, according to the invention, the ferromagnetic member 57 which is attracted to the fixed electromagnet 58 is firmly secured to the moving coil member 56. It is now assumed that four ferromagnetic members 57a–57d are provided and that 57a is used to hold the initial position, 57b is used to control the stop such that it matches to F 11, 57c is used to control the stop such that it matches to F 5.6, and 57d is used to control the stop such that it matches to F 2.8. Then, when the coil member 56 arrives at the position corresponding to one of the ferromagnetic members 57 during its rotation, the electromagnet 58 and the coil pattern 56a of the coil member are de-energized. Thus, it is possible to control the diameter of the aperture of the stop and the period during which the blade is tripped simultaneously. Hence, stop priority automatic exposure control mode which has been unfeasible with the prior art electromagnetically shutter device is made possible. Further, general automatic exposure control mode utilizing a combination of stop and time, and manual control mode are rendered possible.

As thus far described, according to the invention, the simple structure permits an operation for opening and closing the aperture of stop while maintaining the diameter of the aperture. Further, a plurality of exposure control modes using programs can be selected at discretion.

The coil member 56 does not require use of springs, differing from the prior art device, to hold the initial position, and therefore a large electric current is not needed, irrespective of the distance that the coil member moves. Consequently, the consumption of electric current is small, thus lengthening the life of the battery used greatly.

What is claimed is:

1. An electromagnetically driven shutter device comprising:
   at least one first moving coil member used to drive blades to control an aperture and shutter time,
   at least one second moving coil member used to control the moving distance of said first moving coil member by being located in a plurality of positions including its initial position and positions angularly displaced clockwise and counter clockwise from the initial position,
   said second moving coil member also used to control the diameter of a stop,
   fixed permanent magnets which effect a magnetic field on said coil members, and
   a yoke opposite to said magnets,
   wherein said coil members are disposed between the magnets and the yoke.

2. An electromagnetically driven shutter device as set forth in claim 1, wherein said moving coil member act to drive a stop blade and a shutter blade separately.

3. An electromagnetically driven shutter device as set forth in claim 1, wherein all of said moving coil members act to move a stop shutter blade.

4. An electromagnetically driven shutter device as set forth claim 1, wherein the moving coil members are disposed between said fixed permanent magnets and the yoke opposite to the magnets to drive a stop shutter blade and to control the diamer of the aperture of a stop independently of the driving operation, and wherein a a circuit for driving the moving coil members is connected to a control apparatus for permitting one or more of manual exposure control mode, stop priority automatic exposure control mode, shutter time priority automatic exposure control mode, and automatic exposure control mode utilizing a combination of stop and time.

5. An electromagnetically driven shutter device as set forth in claim 1, wherein the moving coil members are disposed between said fixed permanent magnets and the yoke opposite to the magnets, one of the coil members acting to drive a shutter blade, the other acting to determine the diameter of the aperture of a stop, these two coil members being operated one after another.

6. An electromagnetically driven shutter device as set forth in claim 1, wherein ferromagnetic members are firmly fixed on the same circumference as said moving coil members.

7. An electromagnetically driven shutter device as set forth in claim 1, wherein a plurality of ferromagnetic members are securely fixed on the same circumference as said moving coil members, and wherein a fixed electromagnet is disposed in opposite relation to one of said ferromagnetic members.

8. An electromagnetically driven shutter device as set forth in claim 2, wherein the moving coil members are disposed between said fixed permanent magnets and the yoke opposite to the magnets to drive a stop shutter blade and to control the diameter of the aperture of a stop independently of the driving operation, and wherein a circuit for driving the moving coil members is connected to a control apparatus for permitting one or more of manual exposure control mode, stop priority automatic exposure control mode, shutter time priority automatic exposure control mode utilizing a combination of stop and time.

9. An electromagnetically driven shutter device as set forth in claim 1, wherein the moving coil members are disposed between said fixed permanent magnets and the yoke opposite to the magnets, one of the coil members acting to drive a shutter blade, the other acting to determine the diameter of the aperture of a stop, these two coil members being operated one after another.

10. An electromagnetically driven shutter device as set forth in claim 2, wherein the moving coil members are disposed between said fixed permanent magnets and the yoke opposite to the magnets, one of the coil members acting to drive a shutter blade, the other acting to determine the diameter of the aperture of a stop, these two coil members being operated one after another.

11. An electromagnetically driven shutter device as set forth in claim 2, wherein the moving coil members are disposed between said fixed permanent magnets and the yoke opposite to the magnets, one of the coil members acting to drive a stop shutter blade, the other acting to control the distance that the driving coil member moves by being located in a plurality of positions including its initial position and positions angularly displaced clockwise and counterclockwise from the initial position.

12. An electromagenetically driven shutter device as set forth in claim 6, wherein a plurality of ferromagnetic members are securely fixed on the same circumference as said moving coil members, and wherein a fixed electromagnet is disposed in opposite relation to one of said ferromagnetic members.

13. An electromagnetically driven shutter device as set forth in claim 1, wherein said fixed permanent magnets, the yoke disposed opposite to the magnets, the moving coil members disposed in a gap between the magnets and the yoke, and a stop shutter blade driven by the coil members are all disposed around one or more lenses for taking a photograph.

14. The device of claim 13, wherein said moving coil members can be located in a plurality of positions including their initial positions and positions displaced angularly clockwise and counterclockwise from the initial positions, and wherein there is further provided a resilient member to hold the coil members in said initial positions.

15. The device of claim 14, wherein said initial positions provide a normally used value of the stop of the camera.

16. An electromagnetically driven shutter device as set forth in claim 2, wherein said fixed permanent magnets, the yoke disposed opposite to the magnets, the moving coil members disposed in a gap between the magnets and the yoke, and a stop shutter blade driven by the coil members are all disposed around one or more lenses for taking a photograph.

17. A device as set forth in claim 13, wherein said moving coil members can be located in a plurality of positions including their initial positions and positions displaced angularly clockwise and counterclockwise from the initial positions, and wherein there is further provided a resilient member to hold the coil member in said initial positions.

18. A device as forth in claim 16, wherein said moving coil members can be located in a plurality of positions including their initial positions and positions displaced angularly clockwise and counterclockwise from the initial positions, and wherein there is further provided a resilient member to hold the coil members in said initial positions.

19. A device as set forth in claim 17, wherein said initial positions provide a normally used value of the stop of the camera.

20. A device as set forth in claim 18, wherein said initial positions provide a normally used value of the stop of the camera.

21. An electromaagnetically driven shutter device comprising:
 a moving coil member used to drive blades to control an aperture and shutter time,
 ferromagnetic members which are firmly fixed on the same circumference as said moving coil member,
 fixed permanent magnets which effect a magnetic field on said coil member, and
 a yoke opposite to said magnets,
 wherein said coil member is disposed between the magnets and the yoke, and
 a fixed electromagnet is disposed in opposite relation to one of said ferromagnetic members.

* * * * *